INVENTOR
Max A. Schlienger.

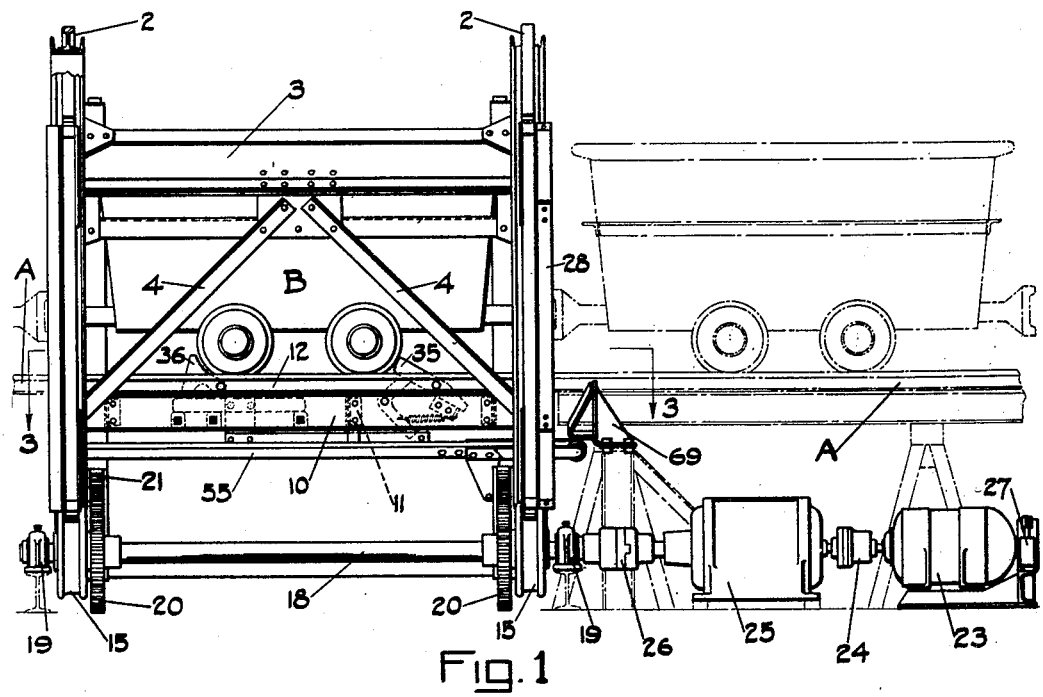
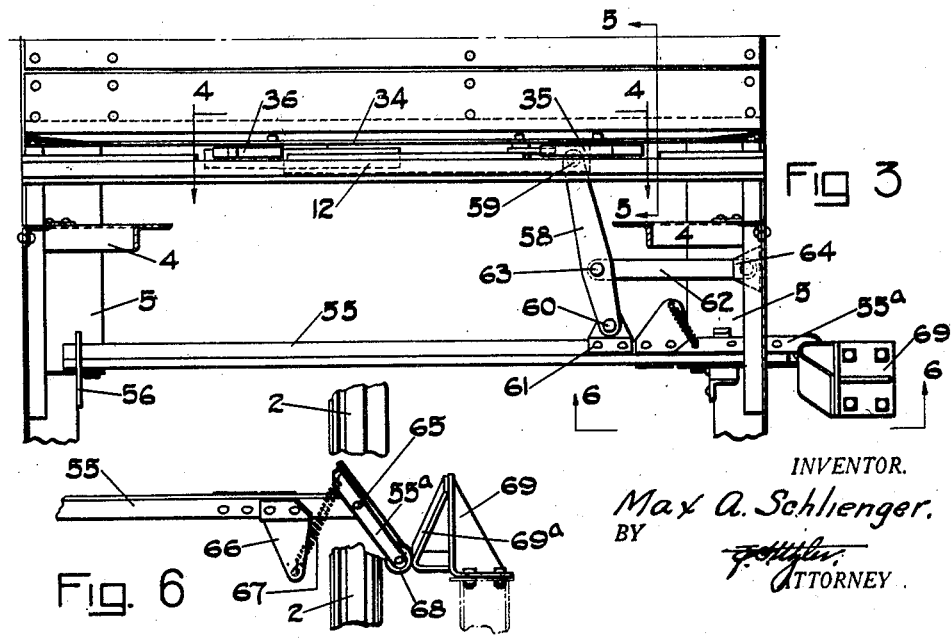

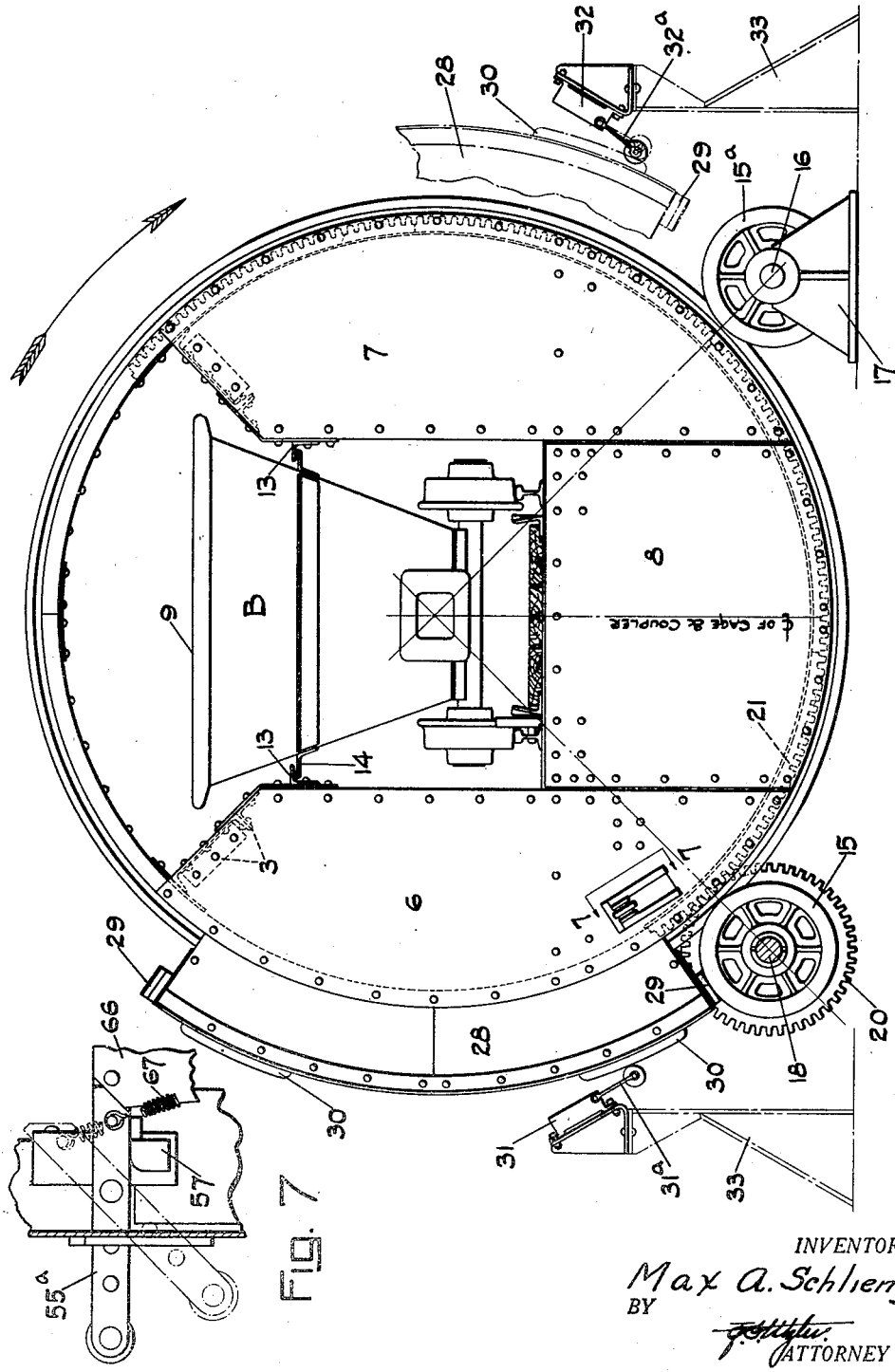

Patented Apr. 20, 1943

2,317,333

UNITED STATES PATENT OFFICE 2,317,333

CAR DUMPER

Max A. Schlienger, Bellevue, Pa., assignor to Pressed Steel Car Company, Inc., Pittsburgh, Pa., a corporation of Pennsylvania Application March 16, 1940, Serial No. 324,348

4 Claims. (Cl. 214—52)

This invention pertains to car dumping mechanism in general and particularly to a rotary car dumping mechanism. The mechanism is actuated by an electric motor and is automatic in operation to the extent that once the dumping operation is started a complete dumping cycle and release of the unloaded car is effected without further act of the operator.

Rotary car dumping mechanisms per se are old. Their chief functions are to receive a car, invert same to discharge the lading and release the unloaded car for exit from the dumper to permit entrance of a loaded car. In modern mining practice a train of cars are hauled to the car dumper for unloading. To detach individual cars from such a train and separately insert and remove each car from the car dumper is time consuming. To avoid this the train of cars are usually run on to a suitable tipple or track which is inclined downwardly toward the dumper and after uncoupling the cars the whole train moves by gravity toward and through the car dumper. The operator of the car dumper then brakes the train at the dumper cage to admit individual loaded cars into the dumper cage and secures same in position within the cage. After dumping, the unloaded car is released by the operator and is moved out of the cage by a loaded car which is fed into the cage by gravity.

An object of the present invention is to provide a rotary car dumping mechanism for rotating a loaded car to inverted position to discharge the lading and return the empty car to normal upright position.

Another object of the invention is to provide a mechanism of the character described which is electrically operated and automatically completes a dumping cycle when once manually started.

Another object of the invention is to dump the cars without uncoupling the individual car from a train of such cars.

Another object of the invention is to provide an automatic car positioning and locking mechanism for holding the car in position in the dumping mechanism during rotation of the cage and releasing the car for movement out of the cage after the dumping cycle is completed.

These and further objects will become apparent as the description proceeds.

Figure 5:
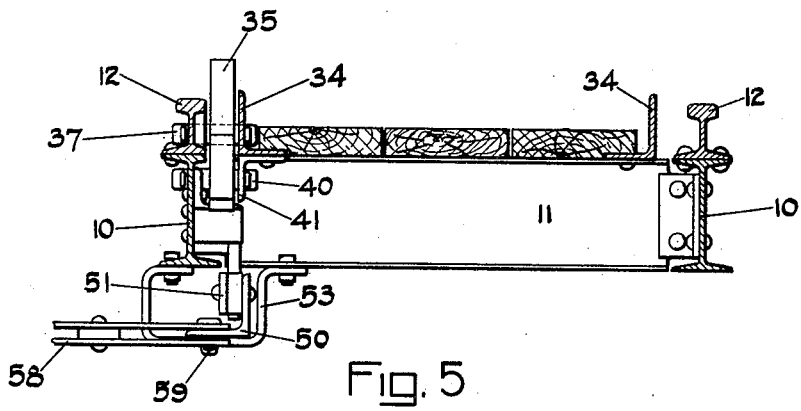
Figure 4:
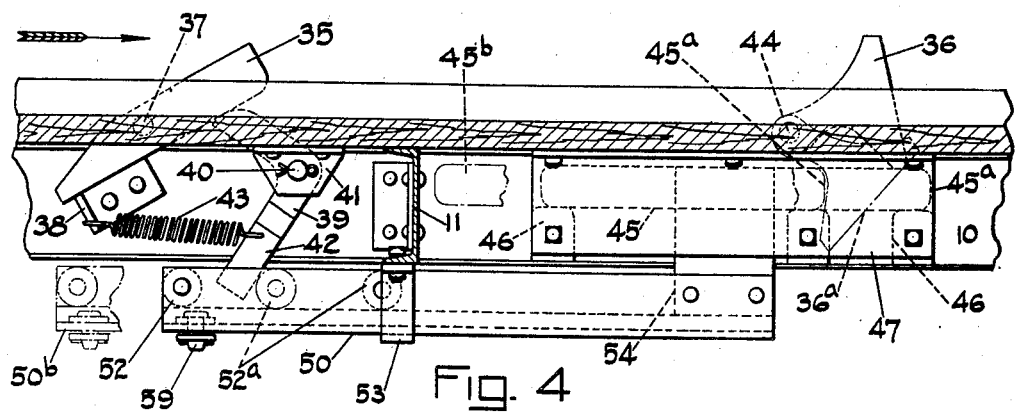
Figure 8:
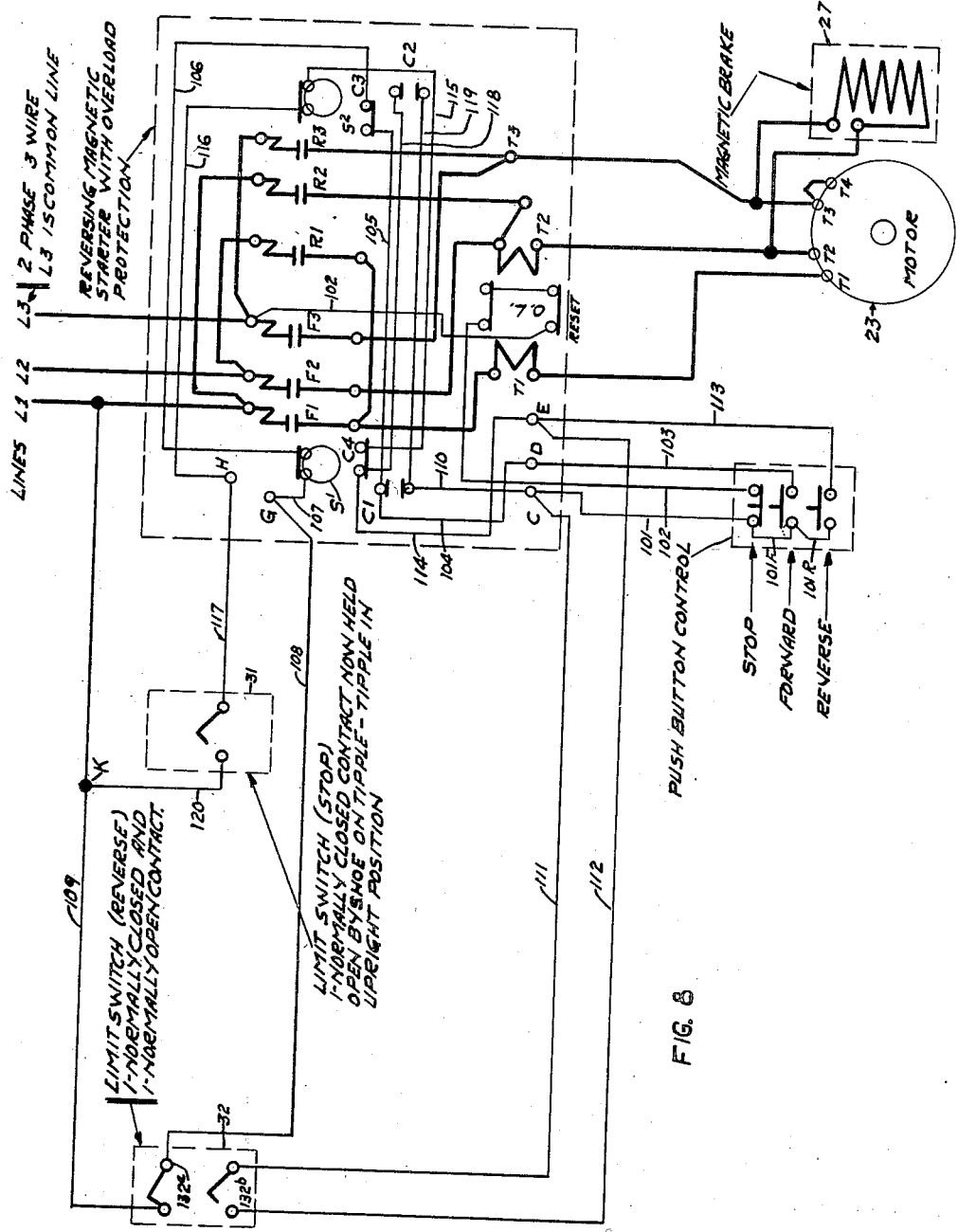

In the drawings forming part of this specification, Fig. 1 shows in front elevation the dumping mechanism of the invention; Fig. 2 shows a side elevation of the dumping mechanism minus the cage rotating means; Fig. 3 shows a section through the cage at lines 3—3 on Fig. 1; Fig. 4 shows an enlarged view of the car stops and is taken on lines 4—4 of Fig. 3; Fig. 5 shows a section through the car rails within the cage and is taken on lines 5—5 of Fig. 3; Fig. 6 is a section through the cage and control for the car stops taken on the lines 6—6 of Fig. 3 after the cage has been partially rotated in the initial dumping direction; Fig. 7 is a section taken on lines 7—7 of Fig. 2 showing details of the operating bar; Fig. 8 illustrates a preferred form of an electric circuit for operating and controlling the electric motor and magnetic brake.

Referring now in detail to the drawings wherein like reference characters refer to like parts, reference character 1 indicates a rotatable cage comprising spaced circular tracks 2 suitably connected and braced by members 3, 4 and 5. Each track 2 is reinforced by plates 6, 7 and 8, which are arranged to permit passage of a mine car 9 and to form end walls of the cage. Extending longitudinally of the cage are spaced beam members 10 having their opposite ends connected to the cage end walls and to the members 5. These beam members 10 are preferably connected intermediate their ends by suitable members 11. Supported by the beam members 10 are car tracks 12 which terminate within the vertical plane of each cage end wall. Disposed at each side of the car tracks 12 and in vertical spaced relation thereto are members 13 fastened to the cage for engaging suitable members 14 on the car to retain the latter upon the car tracks and within the cage when the cage is rotated to dump position.

Disposed beneath each cage end wall are a plurality of roller members 15 which support the cage through the circular tracks 2. At one side of the cage the rollers 15a are mounted on shafts 16 supported in bearings 17. On the opposite side of the cage the rollers 15 are mounted on a shaft 18 which in turn is supported by suitable bearings 19. The rollers 15 and 15a are preferably idler rollers and rotate only upon rotation of the cage. Mounted on the shaft 18 between the rollers 15 are cage driving gears 20 which engage suitable rack members 21 mounted on the cage adjacent the circular tracks 2. The shaft 18 and driving gears 20 are actuated by means of a reversible electric motor 23 through coupling 24, speed reducer 25 and coupling 26. The motor 23 is equipped with a suitable magnetic brake 27, the purpose of which will be hereinafter described.

Mounted on each end wall of the cage and extending along a portion of the periphery thereof is a stop member 28 having shoes 29 at opposite ends thereof for engaging the idler rollers 15 and 15ᵃ to provide positive limitations of rotation in the cage. Supported by at least one of the members 28 are switch shoes 30 in adjustable spaced relation to the shoes 29. At opposite sides of the end of the cage in position to be engaged by the shoes 30 are limit switches 31 and 32 mounted, Fig. 2, on suitable supports 33.

To discharge the lading the cage and car are rotated in the direction indicated by the arrow on Fig. 2 of the drawings. Because of this movement some means must be provided for retaining the car in fixed position within the cage during rotation of the latter. The car tracks 12 have guard rails 34 between the track adjacent each rail 12. These rails position the car transversely of the car tracks. Disposed in longitudinally spaced relation along a side of at least one of the rails 12 are a trip lever 35 and wheel chock 36 as illustrated in Figs. 3 and 4. Each of these have portions engaging the wheels at one side of the car to position the car longitudinally of the car tracks within the cage. The trip lever 35 is pivotally mounted intermediate its ends upon a pin 37 passed through the guard rail 34 and track rail 12. Mounted on member 10 beneath rail 12 is a stop 38 engaging one end of lever 35, limiting rotation of the lever in one direction. Disposed beneath the opposite end of lever 35 is an angularly shaped member 39 mounted on a pin 40 supported by the member 10 and a clip angle 41 riveted to guard rail 34. One end 42 of member 39 is attached to a tension spring 43 which normally holds the opposite end of member 39 in engagement with one end of trip lever 35 so as to maintain that end of the trip lever above the track 12 in position to engage the wheel of the car moving into the cage upon tracks 12 as shown in Fig. 4.

The wheel chock 36 is substantially of T-shape with the free end of the stem thereof pivotally mounted on a pin 44 supported by track 12 and guard rail 34. By reason of the preponderance of the weight of wheel chock 36 being to one side of pin 44 the wheel chock normally depends below the top of the head of adjacent rail 12. In order to support the wheel chock 36 in wheel engaging position a lock bar 45 is disposed beneath the wheel chock and movably supported on the members 46 disposed between the beam 10 and the lock plate 47, the lock plate 47 being supported by the guard angle 34 and secured to the members 46 on beam 10. As shown in Fig. 4 of the drawings the lock bar when moved beneath the chock 36 maintains the latter above the horizontal plane of the car track 12 and when the lock bar 45 is moved to the left bringing the end 45ᵃ of the lock bar into position marked 45ᶜ indicated by dot and dash lines, the chock 36 falls below the head of the rail into a position marked 36ᶜ as indicated in dot and dash lines on Fig. 4, permitting unimpeded passage of the car.

The lock bar operating mechanism, as illustrated in Figs. 4 and 5, comprises the angle 50 having the bar 51 secured thereto and spaced therefrom by means of the members 52. The angle 50 is suspended from the member 11 and guided for movement relative thereto by means of the saddle 53. Adjacent one end of the angle 50 and disposed between the angle and the bar 51 is the member 54 fastened to the angle 50 and to the lock bar 45 thereby supporting the opposite end of angle 50. The member 54 is movable between the beam 10 and lock plate 47 as the lock bar 45 moves relative to the members 46. Adjacent the opposite end of the angle 50, the end 42 of the member 39 is disposed between the angle 50 and the bar 51 and is movable in the space formed between the two said members 50 and 51. As shown in Fig. 4 of the drawings, when the chock 36 is in position to extend above the rail 12 the members 52 are spaced from the end 42 of the member 39. When as indicated in dot and dash lines, the locking bar 45 is moved to the left a sufficient distance to permit the chock 36 to depend below the rail 12 one spacing member 52 is moved to adjacent the end 42 of the member 39 as indicated by the reference character 52ᵃ for a purpose to be hereinafter described.

Referring now to Figs. 1, 3 and 5 of the drawings, a second lock operating bar 55 is disposed between the end walls of the cage with one end of the bar supported in a bracket 56 secured to the end wall and the opposite end engaging a bearing 57 secured to the opposite end wall and better illustrated in Fig. 7 of the drawings. The bar 55 is connected to the angle 50 by means of the lever 58 which has one end pivoted to the angle 50 by means of the pin 59 and the opposite end pivoted by means of the pin 60 to a bracket 61 secured to the bar 55. Intermediate the ends of the lever 58 the strut 62 is pivotally connected to the lever 58 by means of the pin 63 and the strut is supported from an end of the cage by means of the angle 64. As better illustrated in Figs. 6 and 7, one end 55ᵃ of the bar 55 projects beyond the end wall of the cage through an aperture therein. The portion 55ᵃ which is pivotally connected to the bar 55 by means of the pin 65 has the inner end of the said portion bearing on the member 66 secured to the bar 55 so as to prevent rotation in one direction. A tension spring 67 connects the said inner end of the bar portion 55ᵃ to the abutment 66 to resiliently restrain rotation of the bar 55ᵃ in the opposite direction upon the pin 65 and to return the bar 55ᵃ to normal position. Adjacent the outer end of the bar 55ᵃ is a roller member 68 which extends beneath a bracket 69 mounted adjacent the end of the cage when the cage is in normal position. This bracket 69 has an inclined face 69ᵃ to be engaged by the roller 68 upon movement of the cage as will be hereinafter described.

The limit switches 31 and 32 are connected in a suitable electric circuit with a starting switch, the motor 23 and the magnetic brake 27. The switch 31 is normally closed with the arm 31ᵃ depressed as shown in Fig. 2 of the drawings and the switch 32 is normally open with the arm 32ᵃ normally free. When the mechanism is in the position as shown in Fig. 2 of the drawings, and the circuit is energized by closing the starting switch, the motor 23 is started and the circuit is thereafter unaffected by the opening of switch 31. When switch 32 is closed by engagement with shoe member 30 as shown in dot and dash lines on Fig. 2 of the drawings the motor 23 is reversed in its direction of rotation and the subsequent reopening of switch 32 does not affect the said circuit. Upon return of the dumping cage to normal position shoe 30 engages and closes switch 31 causing the circuit to be interrupted by opening of the said starting switch and the movement of the cage is arrested by the setting of the magnetic brake 27.

The normal position of the car dumper without the contained car B is as shown in the drawings except that the various movable parts in Figures 1, 3 and 4 of the drawings are withdrawn to positions as hereinafter described or as indicated by dot and dash lines on Fig. 4. That is, the lock operating bar 55 is withdrawn to the left of the position shown in Fig. 3 of the drawings to bring its portion 55ª from beneath the abutment 69. Likewise in Fig. 4 the lock bar 45 and lock bar operating angle 50 are in the position indicated by dot and dash lines and reference characters 45ᵇ and 50ᵇ so that the wheel chock 36 depends below the rail 12 and spacer 52ª is adjacent end 42 of member 39. A train of coupled cars moving down a suitable incline or having some other means providing locomotion moves upon the preferably inclined track A, as shown in Fig. 1 of the drawings, and as the first car B moving in the direction of the arrow enters the cage, the entering wheels depress the trip lever 35 and pass therebeyond. The downward movement of lever 35 rotates member 39 moving end 42 thereof to the right of the position shown in Fig. 4. During this movement the member 39 engaging member 52ª moves the angle 50 to the right from the position indicated by reference character 50ᵇ to that shown in full lines and carrying with it the lock bar 45 whose end portions 45ª engages with and forces wheel chock 36 to rotate upon pin 44 to bring the wheel chock above rail 12 where it is locked in position as shown by full lines on Fig. 4 of the drawings. This same movement of angle 50 acts through lever 58 to carry lock operating bar 55 to the right and into position as shown by full lines on Fig. 3. The trip lever 35, being acted upon by the tension spring 43, returns to normal position with the passage of the entering wheels of the car and are thereinafter engaged by the rear wheels of the entering car which again depress the trip lever 35 and pass beyond permitting the trip lever 35 to return to normal position. At this point in the movement of the entering car the first wheels of the car engage the wheel chock 36 bringing the car to rest, as shown in Fig. 1 of the drawings, and with a wheel chock in front of the car wheels and the trip lever 35 directly behind the car wheels, the car is maintained in fixed longitudinal relation within the cage.

As illustrated in Fig. 2 of the drawings, when the car B enters the cage the members 14 on the car body engage beneath the members 13 on the cage to retain the cars on the track when the cage is rotated. The operator then closes the starting switch starting up the motor 23 which acts through the coupling 24, speed reducer 25 and coupling 26 to cause rotation of the shaft 18. The spur gears 20 on shaft 18 engaging the associated racks 21 on the cage rotate the cage in the direction indicated by the arrow in Fig. 2 of the drawings. The cars B when not uncoupled are equipped with couplers permitting rotation and the center line of the rotatable coupler is on the horizontal axes of the rotating cage thereby permitting relative rotary movement between the car B within the cage and the cars remaining on track A. As the cage begins to rotate the arm 55ª of the lock operating bar 55 pivots upon its pin 65 permitting the portion 55 to remain in fixed relation on the cage. The continued rotation of the cage brings the arm 55ª and the cage into the position shown in Fig. 6 of the drawings. The further rotation of the cage and the movement of the roller 68 on the arm 55ª along the inclined face 69ª of the abutment 69 permits the arm 55ª to assume its normal position with the assistance of the tension spring 67. During this rotation of the cage the shoe 30 on the cage has moved past the roller on the arm 31ª of the limit switch shown in Fig. 2 of the drawings opening that switch for further control of the electric circuit as hereinbefore stated. Continued movement of the cage brings the portion 28 of the cage into the position indicated by dot and dash lines on Fig. 2 of the drawings wherein the shoe 30 engages the roller on the arm 32ª of the limit switch depressing the arm 32ª, closing the switch and reversing the motor 23 as hereinbefore stated. Inertia in the cage will cause continued movement of the cage past the first point of contact of the shoe 30 with the roller on arm 32ª until the shoe 29 engages with the idler rollers 15 thereby preventing further rotation of the cage. As it will be apparent this position of the cage has rotated the car through an angle of 180° from normal to permit discharge of the lading from within the contained car B. From the time the shoe 30 first engaged the roller on arm 32ª of the limit switch and reversed the motor, the reversed motor has been building up the strength of the electrical field tending to rotate the motor in a direction opposite to that originally causing the rotation of the cage.

During the time it takes the cage to move under its own momentum and that of the discharging car from the position shown in dot and dash lines on Fig. 2 of the drawings until the shoe 29 engages the idler roller 15, sufficient strength will have been built up in the field of the reversed motor to act as a brake and arrest movement of the cage. The shoe 29 merely bears against the roller 15 and acts as a positive limit of rotation. To provide for wear and other contingencies which might upset this adjustment, the shoe 30 is adjustably mounted on the portion 28 of the cage by means of apertures 30ª in member 28 and fastening members 30ᵇ inserted through shoe 30 and aperture 30ª so as to be moved toward or away from the shoe 29 to insure engagement of the shoe 29 with the idler roller but without sufficient force to damage the mechanism. If for any reason the cage should be rotating with sufficient force to cause damage to cage or mechanism upon shoe 29 engaging roller 15, the coupling 24, which is a slip coupling of any well-known form, will slip under the impact and prevent damage to the motor.

The reversed motor at this point now causes rotation of the cage in a direction opposite to that indicated by the arrow on Fig. 2 of the drawings and returns the cage to the normal position shown in Figs. 1 and 2 of the drawings. During this latter return movement of the cage, the roller 68 on the end of the arm 55ª engages the inclined face 69ª of the stop 69 and moving along the said inclined face 69ª forces the arm 55ª inwardly of the cage, carrying the lock operating bar 55 to the left from the position shown in Figs. 1 and 3 of the drawings. This movement of the bar 55 is transmitted through the pin 60 to lever 58 which in turn pivots upon its pin 63 and acting through the pin 59 connecting the lever 58 to the lock operating mechanism angle 50 moves that angle 50 toward the trip lever 35 and carries with it the lock bar 45, both as shown in dot and dash lines on Fig. 4 of the drawings. This movement of the lock bar 45 from beneath the wheel chock 36 releases the wheel chock for downward rotation below the head of the rail 12 supporting the car wheels into a position indicated by dot and dash lines and the reference character 36ᵃ in Fig. 4 of the drawings. Continued rotation of the cage brings the shoe 30 into engagement of the wheel mounted on the arm 31ᵃ of the limit switch, depressing that arm, closing the switch 31 and opening the circuit energizing the motor 23. At the instant the current is cut off from the motor 23 a magnetic brake 27 engages the shaft of the motor 23 to stop the motor and consequently the shaft 18 on which are mounted the driving gears 20 engaging the rack 21 of the cage. During the time it takes the cage to move from the position wherein the shoe 30 first engages the wheel on the arm 31ᵃ until the shoe 29 engages the idler roller 15 the magnetic brake 27 brings the cage to rest without undue damage to the mechanism. To provide for wear and other contingencies the shoe 30 which is adjustably mounted on a portion 28 of the cage and may be moved toward or away from the shoe 29 to insure stopping of the cage by means of the magnetic brake 27 as the shoe 29 engages the idler roller 15. It might be here stated that the cage preferably comes to rest simultaneously with or slightly before the wheel chock 36 moves below the head of the rail supporting the car within the cage. With the cage returned to this position the car within the cage is free to be moved through and out of the cage and the next adjacent coupled car moved into the cage where the same action takes place as hereinbefore described.

In Fig. 8 of the drawings there is shown in diagrammatic form a suggested electric circuit for effecting operation and control of the motor by movement of the dumping mechanism cage. As illustrated, the motor 23 is operated by a three wire, two phase circuit which is controlled by a supplemental circuit embodying a pushbutton control panel and limit switches 31 and 32. The three wires of the motor circuit are indicated by the reference characters L1, L2 and L3 respectively, the line L3 being the common line. The lines L1, L2 and L3 are connected to the motor and attached brake through a reversing magnetic starter provided with overload protection, all as indicated in the drawings. The contactors F1, F2 and F3 and R1, R2 and R3 of the starter being preferably mechanically interlocked for safety. The pushbutton control panel contains three switches indicated respectively as stop, forward and reverse.

The stop switch is normally closed and the latter two switches are normally open. As indicated, one side of the said latter two switches are connected by wires 101R and 101F to one side of the stop switch. That same side of the stop switch is connected by means of the line 101 to a terminal C and one side of contactor C1. Connecting the same side of the contactor C1 is a wire 119 connecting a corresponding side of contactor C2, said contactors C1 and C2 being normally open when the cage is at rest. The opposite side of the stop switch is connected by means of the line 102 and through the overload of the starter to the common line L3, as indicated. Thus line 102 may be designated as a permanently "hot" line.

At the forward switch one side thereof is connected by means of the line 101F to line 101 side of the stop switch which, as previously stated, is normally closed so that the line 101F is normally connected through the stop switch with the "hot" line 102. The remaining side of the forward switch is connected by means of the line 103 with a terminal D which in turn is connected by means of the line 104 with a side of the contactor C1 and opposite from that side to which the line 110 is connected. As shown, contactor C1 is normally open. Line 104 is connected through its side of the contactor C1 by means of line 105 with a contactor C3 which is normally closed, said contactor C3 being in turn connected by means of the line 106 with the forward starter solenoid S1. Line 107 connects the solenoid S1 with a terminal G which in turn is connected by means of line 108 with the normally closed contact 132ᵃ of reverse limit switch 32. The contact 132ᵃ is in turn connected by means of line 109 through terminal K to the line L1.

The stop limit switch 31, having but one contact which is normally closed but is held open when the arm 31ᵃ is engaged by the shoe 30ᶜ of the cage, is connected to the line L1 through the terminal K by means of the line 120 and is connected to the reverse starter solenoid S2 through the line 117, terminal H and line 116. The pushbutton reverse switch, as illustrated, is connected to line 101 side of the stop switch through the lines 1R and 1F. The opposite side of the pushbutton reverse switch is connected by means of the line 113 to terminal E, which is connected by means of the line 114 to one side of the normally closed contactor C4. The line 114 side of contactor C4 is connected by means of the line 118 to one side of the normally open contactor C2. The opposite side of the contactor C4 is connected by means of the line 115 to the solenoid S2. Terminal E is connected by means of line 112 to the normally open contactor 132ᵇ of the reverse limit switch 32 and through the switch by means of line 111 to the terminal C.

The circuit, just described, embodies certain safety features in that the movement of the cage of the dumping mechanism can be stopped at any intermediate position and can be started again in a forward direction at any intermediate point in the dumping cycle regardless of the direction in which the cage was moving just prior to its being stopped rotating. And further, the cage can be rotated in a reverse direction from any intermediate point after the shoe 30ᶜ has moved out of contact with the arm 31ᵃ of the stop limit switch 31. By reason of these features the portion of the control circuit which starts the motor in either a forward or reverse movement is different from that which controls the continuing movement of the motor and cage in the selected direction. This is made necessary by reason of the two types of controls, namely, the automatic control after the dumping mechanism is once set in motion, and the manual control through the pushbuttons normally controlling starting, stopping or reversing the dumping mechanism, as will have been understood from the foregoing description of both the dumping mechanism and the electric circuits. The dumping mechanism, after having completed a dumping cycle, can only be set in motion again by manually operating the forward pushbutton switch on the pushbutton control panel.

Assuming the car dumping mechanism and cage in the position shown by Figs. 1 and 2, and it is desired to move the cage in a forward direction, i. e. the direction shown by the arrow in Fig. 2, the operator would press the pushbutton marked "forward" connecting the two terminals of that switch so that line L3 would be connected to one side of the switch through the line 102 and the stop switch. The opposite side of the switch marked "forward" would be connected through line 103, terminal D, line 104, line 105, contact C3, line 106, solenoid S1, line 107, terminal G, line 108, contact 132ª of switch 32, and line 109, with line L1 establishing a circuit which would operate solenoid S1 to close contacts F1, F2 and F3, energizing motor 23. The closing of contacts F1, F2 and F3 causes contact C4 to open and contact C1 to close. The closing of contact C1 causes the current flowing from line L1 to move through contact C1, line 110, terminal C, and line 101 so that the forward running circuit is now entirely through the stop switch. The forward switch which was connected to contact C1, through line 103, contact D, and line 104 has now been cut out. Thus at any moment should the operator press the stop switch breaking the circuit, the solenoid S1 would return to position breaking the contacts at F1, F2 and F3, and stopping of the motor 23 through the magnetic brake 27. Obviously, if the operator would again press the forward switch, the same conditions as just previously described would obtain to again energize the motor.

If, instead, the operator should manually close the reverse switch, one side of which is connected through the lines 101R, 101F, the stop switch, and line 102, which is the "hot" line, the other side of the reverse switch would be connected through line 113, terminal E, line 114, contact C4, line 115, solenoid S2, line 116, terminal H, line 117, to switch 31. If shoe 30ᶜ had moved away from arm 31 of the switch, permitting it to close and connect line 120 through terminal K to line 109 and line L1, a circuit would be established actuating solenoid S2, closing contacts R1, R2 and R3 to rotate the motor in a reverse direction. The operation of solenoid S2 would also open contact C3 and close contact C2, resulting in the current in line 15 flowing through contact C4 to pass through line 118, contact C2, line 119, one side of contact C1, line 110, terminal C, line 101, and complete the circuit through the stop switch cutting out lines 114, terminal E, and line 113, extending to the reverse switch. The motor would thus continue running until stopped through manual operation of stop switch or the opening of limit switch 31 by reason of contact of shoe 30ᶜ with the arm 31ª of the stop limit switch.

Assuming, now, that the mechanism is in the position shown by Figs. 1 and 2, and the dump mechanism completes a dumping cycle without intermediate stopping, the following circuits would be established. The operator would manually close the forward switch, establishing the previously described circuits through lines L1 and L3, operate solenoid S1, and establish a forward running circuit through the stop switch, all as previously described. Upon the dumping mechanism and cage rotating in the direction indicated by the arrow on Fig. 2, the shoe 30, as indicated in dot and dash lines, would engage the arm 32 and attached roller, opening the normally closed contact of reverse limit switch 32, breaking the forward running circuit, which would normally tend to cut off current from the motor and cause the magnetic brake 27 to automatically set. The limit switch 32 is, however, provided with two contacts so that contact 132ᵇ, which is normally open, is simultaneously closed by the action of the shoe 30 in opening contact 132ª so that line 111 leading from closed contact 132ᵇ establishes through terminal C contact with line 101 side of the stop switch and closed contact 132ᵇ establishes contact through line 112, terminal E, line 114, closed contact C4, line 115, solenoid S2, line 116, terminal H, line 117, closed switch 31, line 120, terminal K, line 109 to L1, again completing the circuit through the stop switch. The completion of this circuit energizes solenoid S2, closing contact R1, R2, R3, to release the magnetic brake and energize the motor in a reverse direction. As previously described, operation of solenoid S2 opens contact C3 and closes contact C2 so that current flowing from line L1 through the limit switch 31 to the solenoid S2 now passes through the closed contact C2, through one side of open contact C1 to energize line 101, directly instead of through closed contact 132ᵇ of limit switch 32. Thus upon reversing of the motor and movement of the cage in a reverse direction so that shoe 30 moves out of engagement with arm 32ª of reverse limit switch 32, causing contact 132ᵇ of reverse limit switch 32 to open, and contact 132ª thereof to close, current flowing to the motor is not interrupted and the mechanism continues to move in the reverse direction until shoe 30ᶜ engages arm 31ª and attached roller of stop limit switch 31, opening the normally closed contact thereof, breaking the circuit, causing solenoid S2 to return to normal position and contacts R1, R2, R3 to open, stopping the motor and automatically applying magnetic brake 27 to bring the mechanism to rest as the shoe 29 engages the idler 15, as previously described. The mechanism then, of course, remains at rest until the operator again manually closes the forward switch.

It will be obvious from an examination of Fig. 7, current from line L1 can only actuate solenoid S2 through stop limit switch 31, which is positively held open when the mechanism is in the position shown in Fig. 2. Hence the motor 23 cannot be operated in a reverse direction when the mechanism is in the position shown in Fig. 2. Likewise, if for any reason the mechanism should be stopped at the end of its forward movement or during any period when the shoe 30 has depressed the arm 32ª and attached roller of reverse limit switch 32, motor 23 could not be operated in a forward direction because current from line L1 can only operate solenoid S1 through contact 132ª of reverse limit switch 32, which contact is positively held open whilst shoe 30 is in contact with the arm 32ª and attached roller of limit switch 32.

In the foregoing description and in the drawings I have described the preferred mode of operation of the mechanism and a preferred embodiment of the invention. It will be understood, however, that to those skilled in the art many modifications in the details and preferred form of invention will suggest themselves without departing from the spirit of the invention, and it is to be understood that I do not desire to limit myself to the exact form of the invention as herein described except as made necessary by the scope of the appended claims.

Having thus described the invention what I claim as new and desire to secure by Letters Patent is:

1. In a rotary car dumping mechanism, in combination, a car receiving and supporting cage having peripherally supported circular end walls and rotating about a horizontal longitudinal axis, a rack and gear drive mechanism associated with said cage for oscillating the cage to invert a contained car to discharge the lading therein, a reversible electric motor for actuating said drive mechanism and having a magnetic brake operating on one end of the motor shaft, a slip coupling connecting said motor to said drive mechanism and set to disconnect same at a predetermined motor shaft torque, abutments on opposite sides of one end of said cage and spaced shoes on the cage engaging said abutments to limit the amount of oscillation of said cage, an electric circuit including normally open switch members disposed at opposite sides of said cage for controlling operation of the cage by reversing the running motor a predetermined distance prior to extreme displacement of the cage from normal position and for cutting off current to the motor and applying the brake a predetermined distance prior to the return of the displaced cage to normal position, and spaced shoes adjustably mounted on the cage for engaging and closing said switches during oscillation of the cage to effect braking control of the moving cage through the motor.

2. In a rotary car dumper, a rotatable car receiving cage moving substantially 180° and returning to effect a dumping cycle, a reversible electric motor for rotating the cage, a switch for de-energizing the motor, a switch for reversing the motor, a brake for stopping the motor, an electric circuit connecting said motor and switches and including a manually operated motor starting switch, adjustable means on the cage for operating the motor de-energizing switch when the cage is returning to car receiving position and setting the brake, adjustable means on the cage in peripheral spaced relation to the first named means to engage the motor reversing switch for automatically reversing the motor as the cage approaches full dumping position and using the energy of the reversed motor in stopping and reversing the cage at fully dumped position.

3. In a rotary car dumper, a rotatable car receiving cage rotating 180° and returning in a complete dumping cycle, a reversible electric motor for actuating the cage, a driving connection between the motor and cage including a coupling set to slip at a predetermined torque, switch means for de-energizing the motor, switch means for reversing the motor, adjustable means on the cage for operating the motor de-energizing switch upon return of the cage from dump to car receiving position, adjustable means on the cage for operating the motor reversing switch a substantial period of time prior to arrival of the cage in dump position, and an electric circuit including the motor, switches and a manually controlled means for starting the motor.

4. In a rotary car dumper, a rotatable car receiving cage moving 180° from normal to dump position and returning to complete a dumping cycle, a reversible electric motor for actuating the cage, switch means for de-energizing the motor upon return of the cage from dump to normal position, switch means for reversing the motor, an electric circuit including the motor deenergizing and reversing switches and a manually controlled motor starting switch, peripherally spaced abutment members on the cage providing positive limits of rotation of the cage into dump and normal positions, a driving connection between the cage and motor including a coupling set to slip at a predetermined torque, means on the cage for operating the switch de-energizing the motor upon return of the cage from dump to normal position, and adjustable means spaced along the periphery of the cage from the first switch operating named means for operating the motor reversing switch a substantial period of time prior to the cage reaching full dump position to utilize the reversed motor as a brake on the rotating cage.

MAX A. SCHLIENGER.